(12) United States Patent
Tsuji et al.

(10) Patent No.: US 6,384,897 B1
(45) Date of Patent: May 7, 2002

(54) FILM CARRIER WITH FILM HOLDING AND CONVEYING MECHANISMS

(75) Inventors: Junichi Tsuji; Izumi Seto, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/332,945

(22) Filed: Jun. 15, 1999

(30) Foreign Application Priority Data

Jun. 15, 1998 (JP) .......................................... 10-167158

(51) Int. Cl.[7] .......................... G03B 27/52; G03B 27/48
(52) U.S. Cl. .............................. 355/41; 355/40; 355/50
(58) Field of Search ............................. 355/75, 40, 41, 355/72, 50

(56) References Cited

U.S. PATENT DOCUMENTS 5,343,273 A * 8/1994 Yamamoto et al. ........... 355/75
5,612,765 A * 3/1997 Yoshikawa et al. ........... 355/72
5,933,214 A * 8/1999 Satoh et al. ................... 355/50

* cited by examiner

Primary Examiner—Russell Adams
Assistant Examiner—Peter B. Kim
(74) Attorney, Agent, or Firm—Sughrue Mion, PLLC

(57) ABSTRACT

A film carrier which convenes photographic photosensitive material on which an image is recorded, over a scanning section through which light from a light source passes. The film carrier includes a base placed above the scanning section, a platen movable over the base, a mask which is set on the platen, a pressure plate which together with the mask sandwiches the photographic photosensitive material, a moving device which moves the platen reciprocally over the base, and a conveying device provided at the mask for conveying the photographic photosensitive material.

15 Claims, 18 Drawing Sheets

F I G. 3
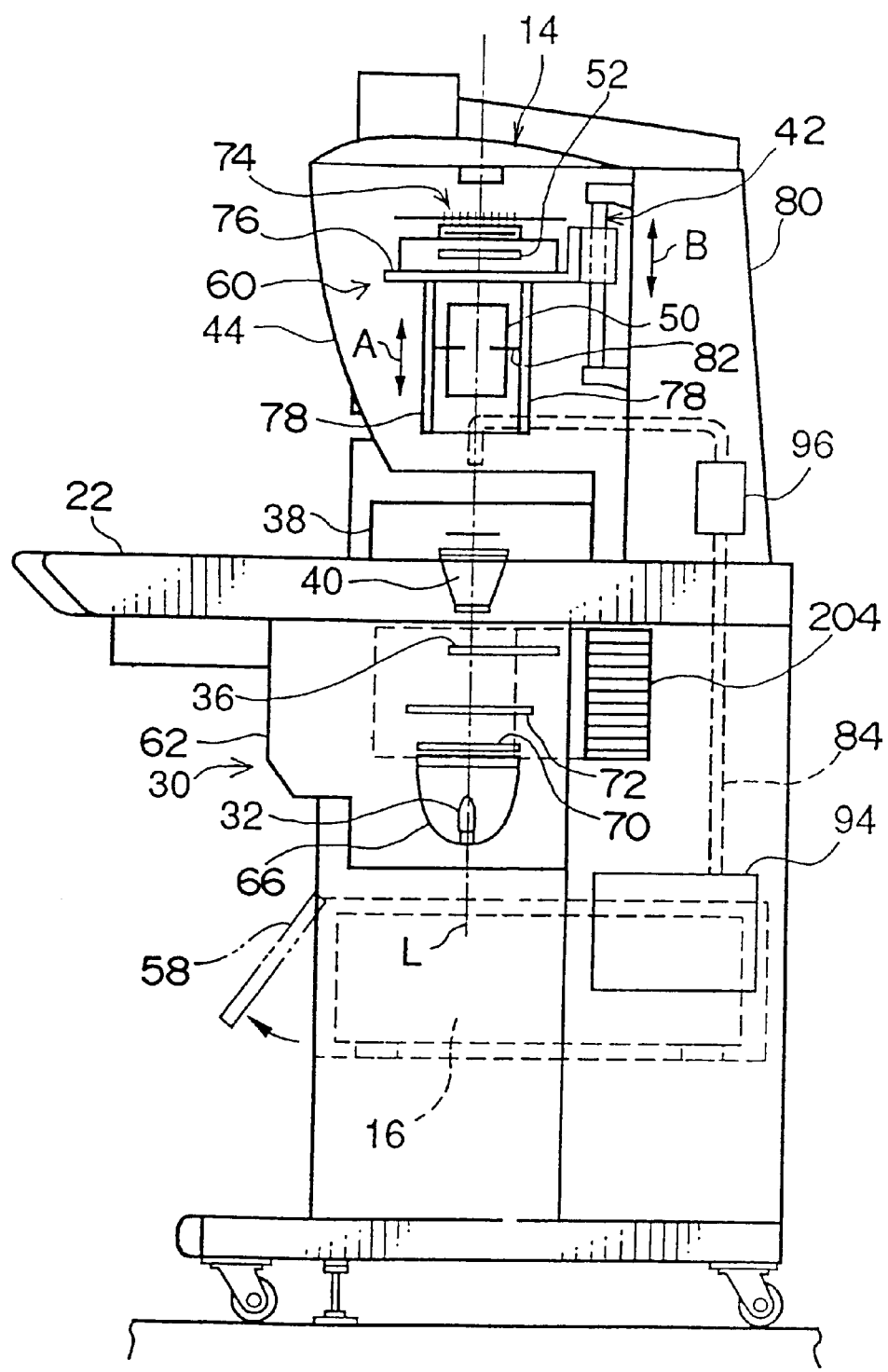

F I G. 6
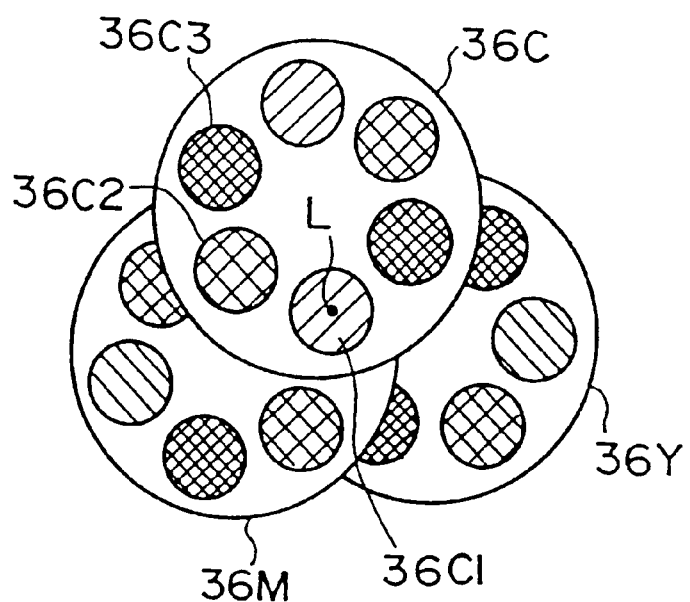

FILM CARRIER WITH FILM HOLDING AND CONVEYING MECHANISMS

BACKGROUND OF THE INVENTION

1. Field of the Invention

The present invention relates to a film carrier which conveys a photographic photosensitive material at a predetermined speed for reading the image data thereof.

2. Description of the Related Art

A photographic processing apparatus has been proposed which separates a film image recorded on a photographic film into R, G, and B color components, reads the respective R, G and B color component data, carries out image processing such as correction on the read image data, and thereafter, displays an image based on the processed data on a display or records an image based on the processed data onto a recording material.

This photographic processing apparatus is provided with a film carrier which conveys an elongated or sheet-like photographic film to a scanning section at a predetermined speed for reading the images recorded on the photographic film with a CCD sensor accurately at a high speed.

The present inventors as well as others have proposed various ideas for film carriers. However, there still is room for further improvement with regard to convenience of operation for the operator.

SUMMARY OF THE INVENTION

In view of the aforementioned, an object of the present invention is to provide a film carrier in which convenience of operation for the operator is improved and which can process a large number of photographic photosensitive materials quickly and accurately without requiring complicated operations by the operator.

The film carrier of a first aspect of the present invention is set on a scanning section, and conveys a photographic photosensitive material on which images are recorded.

The photographic photosensitive material is sandwiched between a mask set on a platen and a pressure plate which presses the mask. A moving means moves the platen reciprocally over a base so that a line sensor in the scanning section reads the image data recorded on the photographic photosensitive material.

Further, a conveying means is provided at the mask and feeds the photographic photosensitive material frame-by-frame on the platen. Thus, there is no need to open the pressure plate to feed the photographic photosensitive material frame-by-frame.

In a second aspect of the present invention, a holding means which holds the photographic photosensitive material is attached to the platen. The platen moves over the scanning section to allow a line sensor of the scanning section to read the image information recorded on the photographic photosensitive material.

A second conveying means which conveys the photographic photosensitive material is provided at the holding means so that the photographic photosensitive material can be fed frame by frame on the platen. Driving force is transmitted to the second conveying means from a first conveying means provided at the platen. When the platen is moved to a predetermined position, driving force is transmitted to the first conveying means from a drive source provided at the base.

In the present invention, the first conveying means preferably comprises a shock buffering means to buffer the shock between the first conveying means and the drive source when the platen is moved to the predetermined position. Damage to the drive source and the first conveying means caused by shock is thereby suppressed.

In the present invention, preferably, the first conveying means comprises a support member fixed to the platen, and a first rotational force transmitting member rotatably attached to the support member, rotational force being applied to the first rotational force transmitting member from the drive source when the platen is moved to the predetermined position; the shock buffering means comprises a support portion which supports the first rotational force transmitting member such that the first rotational force transmitting member is slidable in the moving direction of the platen, and an urging means which urges the first rotational force transmitting member toward the drive source; and the second conveying means comprises driven rollers provided at the holding means, drive rollers which are provided at the holding means and which, together with the driven rollers, nip and convey the photographic photosensitive material, and a second rotational force transmitting member provided at a shaft to which the drive rollers are attached, the rotational force being applied to the second rotational force transmitting member from the first rotational force transmitting member.

In this structure, the first rotational force transmitting member is supported by the support portion of the support member fixed to the platen, such that the first rotational force transmitting member is rotatable and slidable in the moving direction of the platen. The first rotational force transmitting member is urged toward the drive source by an urging means, and when the first rotational force transmitting member abuts the drive source, the first rotational force transmitting member slides so as to buffer the shock. As the first rotational force transmitting member abuts the drive source, the rotational force is transmitted to the first rotational force transmitting member from the drive source.

The driven rollers and the drive rollers of the holding means attached to the platen nip and convey the photographic photosensitive material. A second rotational force transmitting member is provided at the shaft of the drive rollers, and rotational force is applied to the second rotational force transmitting member from the first rotational force transmitting member. The rotational force is thereby transmitted from the drive source to the first rotational force transmitting member, and in turn, to the second rotational force transmitting member.

In the present invention, it is also possible for a holding means without the second conveying means, such as a mount mask, to be able to be attached to and removed from the platen.

In a third aspect of the present invention, when the platen is moved to a predetermined position, driving force is transmitted directly from a drive source provided at the base to the conveying section provided at the holding means, so that the conveying section conveys the photographic photosensitive material.

In the present invention, preferably, the periphery of a slit, which is provided in the base and corresponds to the scanning section, is covered by a cover, and the slit is covered by a transparent plate. Therefore, no foreign matter falls into the scanning section.

BRIEF DESCRIPTION OF THE DRAWINGS

FIG. 3 is a cross-sectional view, as viewed from the side, of the optical system of the image reading apparatus to which the film carrier relating to the first embodiment of the present invention is mounted.

FIG. 6 illustrates a variant example of turrets.

DESCRIPTION OF THE PREFERRED EMBODIMENTS

Overall Structure of Image Reading Apparatus to Which Film Carrier is Mounted

Figure 1:
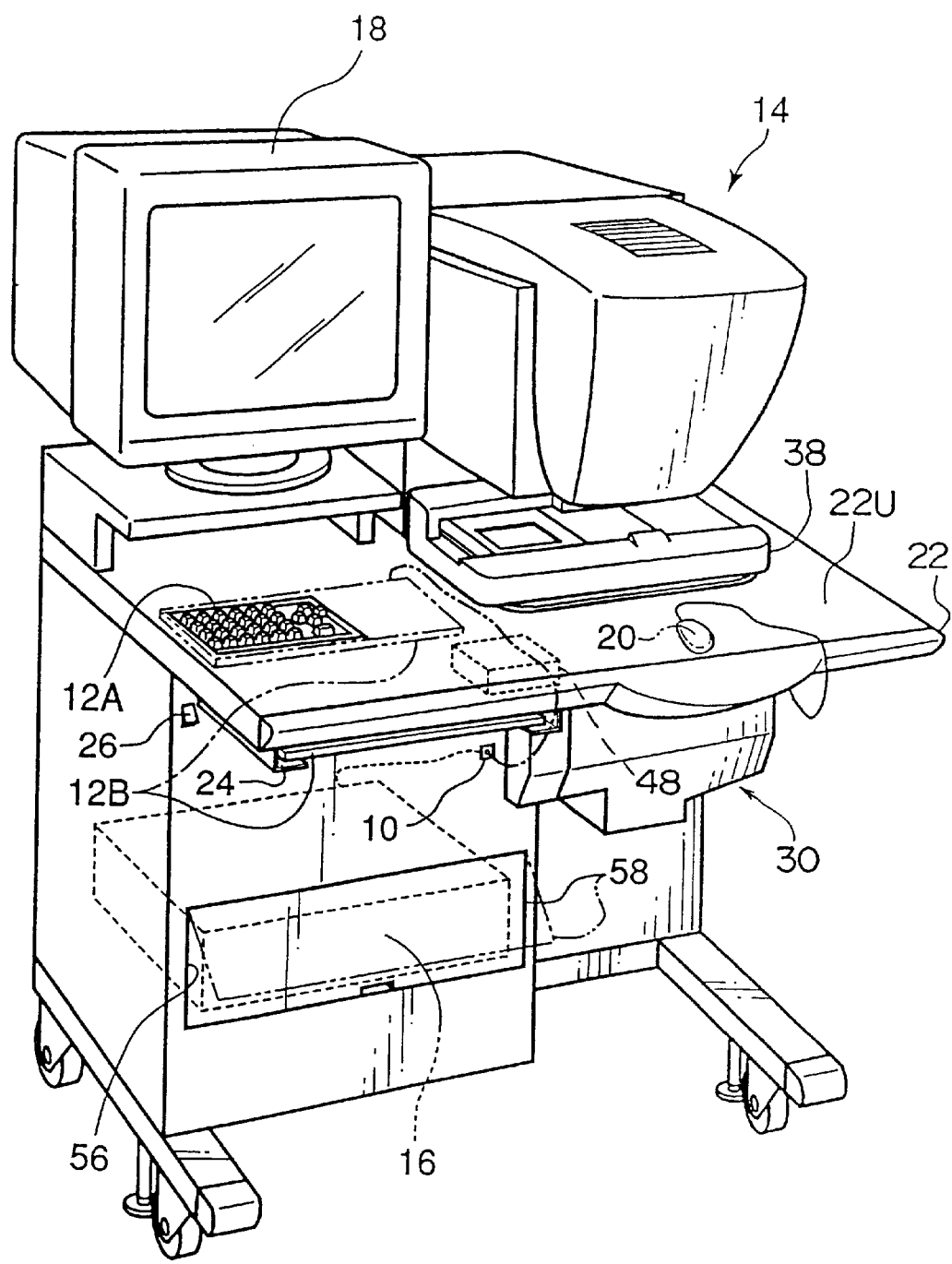
FIG. 1 is a view illustrating the exterior of an image reading apparatus to which a film carrier relating to a first embodiment of the present invention is mounted.
Figure 2:
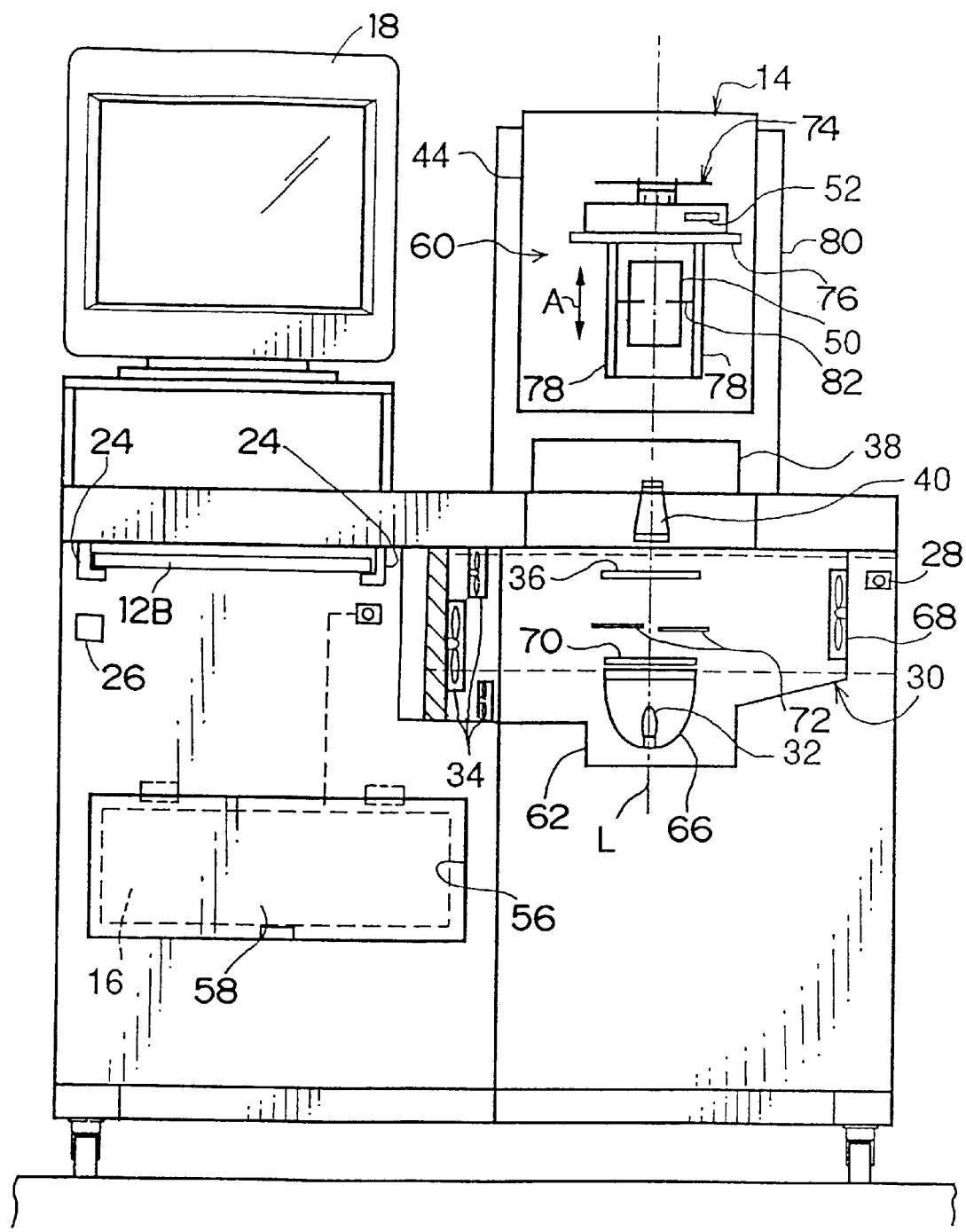
FIG. 2 is a cross-sectional view, as viewed from the front, of an optical system of the image reading apparatus to which the film carrier relating to the first embodiment of the present invention is mounted.

As shown in FIGS. 1 through 3, an image reading apparatus 14 is provided with a personal computer 16, a mouse 20, two types of keyboards 12A and 12B, and a work table 22 provided with a display 18.

The keyboard 12A is embedded in a work surface 22U of the worktable 22 so as to be flush with the work surface 22U. The keyboard 12B, when not in use, is accommodated in L-shaped cradles 24 provided at the under surface of the work table 22, so that the keyboard 12B will not be in the way.

When the keyboard 12B is to be used, it is placed on top of the keyboard 12A. Then, the cord of the keyboard 12B is connected to a connector 10 connected to the personal computer 16. By placing the connector 10 on the front surface of the worktable 22, the operator need not to bend over to connect the cord of the keyboard 12B to the personal computer 16. A switch 26 for setting up the system is provided on the left-hand side of the front surface of the worktable 22.

Figure 4:
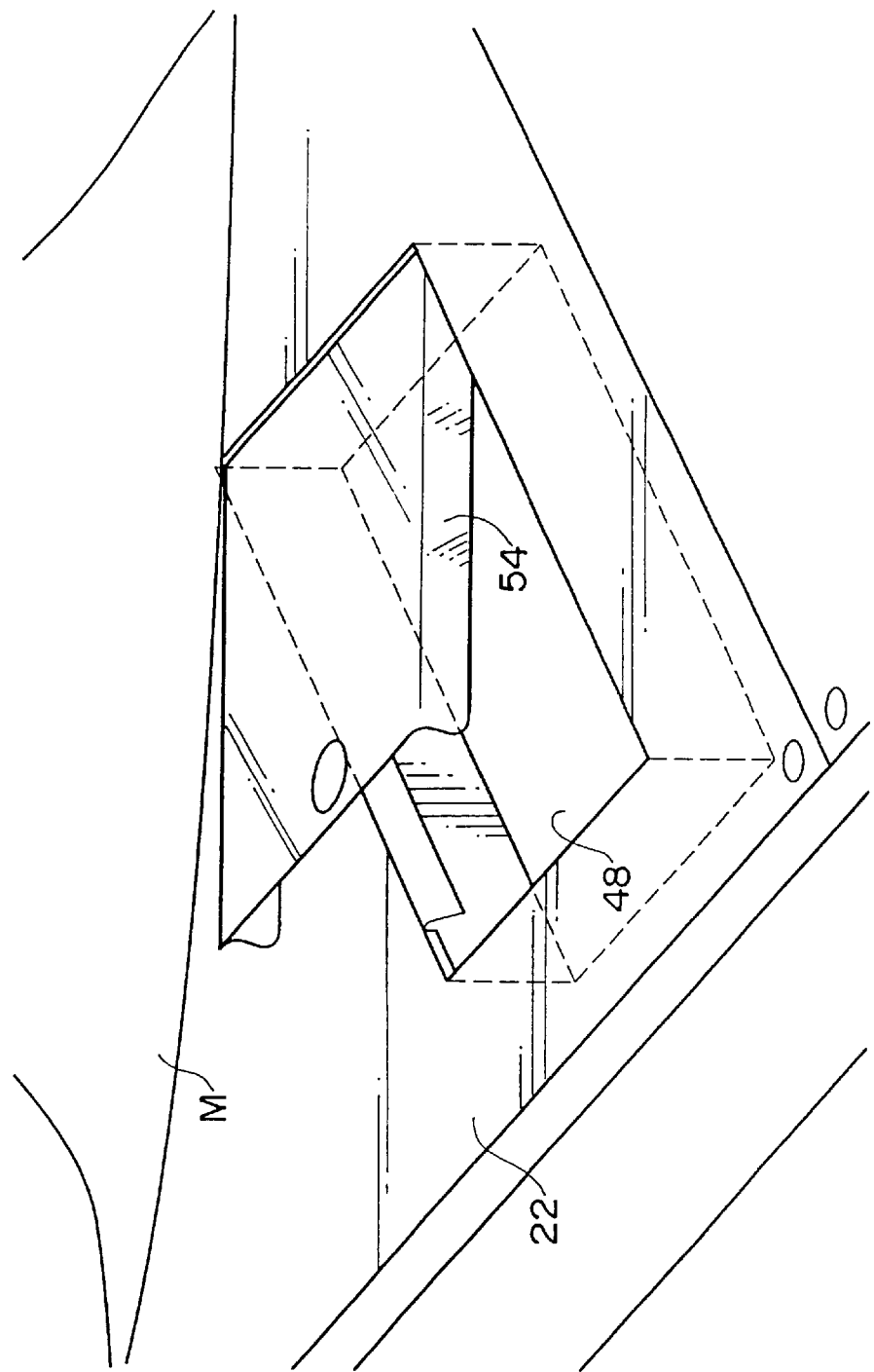
FIG. 4 is a perspective view of main portions of an accessory box provided in a worktable of the image reading apparatus.

The cord of the mouse 20 is connected to a connector 28 connected to the personal computer 16. The connector 28 is disposed on the right-hand side of the worktable 22. The mouse 20 is accommodated in a box portion 48 provided as a recess in the worktable 22. As shown in FIG. 4, the opening of the box portion 48 is opened or closed by a lid 54. A mat M is laid on the lid 54, and thus the box portion 48 is usually not seen. That is, when the mouse 20 is to be used, the mouse 20 is taken out from the box portion 48 and connected to the connector 28. The box portion 48 can also hold accessories such as floppy disks or brushes.

Further, the personal computer 16 is accommodated within an accommodating portion 56 provided below the worktable 22, so that the personal computer 16 does not get in the way. The opening of the accommodating portion 56 is closed by a door 58 so as to prevent misoperation of the personal computer 16 caused by the legs of the operator inadvertently contacting the personal computer 16 or the like. By opening the door 58 toward the front, the operator can easily install new software into the personal computer 16.

The image reading apparatus 14 is an apparatus for reading film images recorded on photographic photosensitive materials (hereinafter simply called "photographic films"), such as photographic films like negative films or reversal films, and can read film images of, for example, 135 size photographic films, 110 size photographic films, photographic films with a transparent magnetic layer formed thereon (240 size photographic films, known as APS films), and 120 size and 220 size (brownie size) photographic films. The term "photographic film" as used herein is a film having negative or positive images which are made visible through developing processing after being used to photograph objects.

Output image data from the image reading apparatus 14 is input to the personal computer 16, the personal computer 16 carries out image processing such as correction on the input image data, and the processed image data is output to a laser printer section (not shown) as image data for recording.

The optical system of the image reading apparatus 14 is provided with a light source section 30 disposed below the worktable 22, a diffusion box 40 supported at the worktable 22, a film carrier 38 set on the worktable 22, and a scanning section 60 disposed at the side of the worktable 22 opposite the side at which the light source section 30 is disposed.

The light source section 30 is housed in a casing 62 made of metal, and inside the casing 62 is disposed a lamp 32 which is a halogen lamp, a metal halide lamp, or the like.

A portion of the light from the lamp 32 is reflected by a reflector 66 and emitted in a given direction. A plurality of fans 34 and 68 are provided at the sides of the reflector 66. The fans 34 and 68 are operated while the lamp 32 is on in order to prevent the interior of the casing 62 from overheating.

Figure 5:
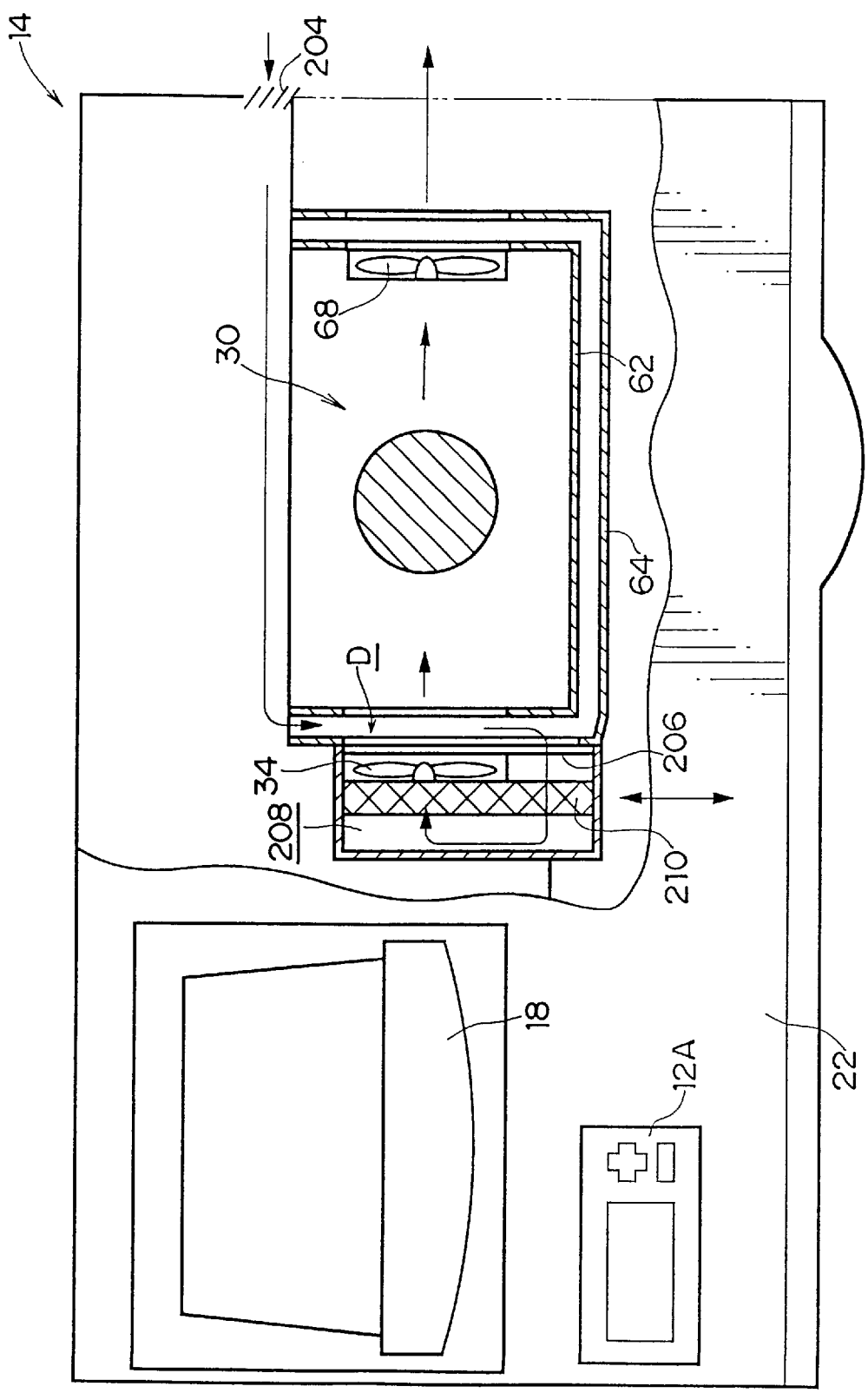
FIG. 5 is a cross-sectional view, as viewed from the top, showing the flow of cooling air in a light source section of the image reading apparatus.

The peripheral surface of the casing 62, as shown in FIG. 5, is covered with a cover 64 made of resin via spacers (not shown), so as to prevent the legs of the operator from touching the casing 62 directly. This gap formed between the cover 64 and the casing 62 is utilized as a duct D.

That is, the air is guided from an inlet port 204 (see FIG. 3) formed on the right side plate of the worktable 22, through the duct D, to an intake port 206 which is open next to beside the fans 34. Then, the air flows around from the intake port 206 into a cavity portion 208 behind the fans 34 and is blown out by the fans 34 through an air filter 210, and is exhausted to the outside by the fan 68. The air filter 210 can be pulled out toward the front side of the worktable 22.

By utilizing this structure in which the duct D is used to have the air flow around to the back side of the fans 34, the casing 62 does not project out at the front side of the worktable 22 so that the appearance of the apparatus is pleasing.

As shown in FIGS. 2 and 3, a UV/IR cutting filter 70, a diaphragm 72, and a turrets 36 are provided at the light emission side of the reflector 66 on the optical axis L of the light emitted from the reflector 66. The UV/IR cutting filter 70 cuts lights of wavelengths in the ultraviolet region and the infrared region to prevent the temperature of the photographic film from rising, therefore improving the reading accuracy. The diaphragm 72 adjusts the amount of light from the lamp 32 and the amount of light reflected from the reflector 66. The turrets 36 appropriately set color components of the light reaching a scanning section 60 according to the type of the photographic films (negative film/reversal film). The diaphragm 72 is formed by a pair of plate members which are disposed at either side of the optical axis L and which slide to approach and to move away from each other.

The diffusion box 40 is formed such that the length thereof along the conveying direction of the photographic film conveyed by the film carrier 38 decreases toward the top portion of the diffusion box 40, and the length of the diffusion box 40 in the direction orthogonal to the conveying direction of the photographic film increases toward the top portion of the diffusion box 40.

The light which enters the diffusion box 40 is directed toward the film carrier 38 (i.e. the photographic film) is made into slit light whose longitudinal direction is the transverse direction of the photographic film, is made into diffused light by the light diffusing plates, and exits from the diffusion box 40. In this way, by making the light which exits from the diffusion box 40 diffused light, there is less unevenness of the amount of light illuminated onto the photographic film 22, slit light of a uniform amount of light is illuminated onto the film image, and even if the film image is scratched, the scratches are difficult to notice.

A loading stand 76 having a line CCD 74 mounted to the top surface thereof is provided inside the casing 44 of the image scanning section 60. A plurality of support rails 78 are suspended from the loading stand 76.

A lens unit 50 is supported by the support rails 78 in such a manner that the lens unit 50 can slide in the directions of arrow A to approach or move away from the worktable 22 for changing the magnification, such as reduction or enlargement. A support frame 80 is provided upright from the worktable 22. The loading stand 76 is supported on a guide rail 42 mounted to the support frame 80, in such a manner that the loading stand 76 can slide in the directions of arrow B to approach or move away from the worktable 22 to ensure the conjugate length when the magnification is changed or during automatic focusing.

The lens unit 50 is formed from a plurality of lenses, and a lens diaphragm 82 is provided between the plurality of lenses. The amount of light passing through can be varied by the lens diaphragm 82.

In the line CCD 74, sensing portions with electronic shutter mechanisms are provided in three parallel lines spaced apart from one another. Each sensing portion is provided with a plurality of photoelectric converting elements such as CCD cells and photodiodes in a line along the traverse direction of the photographic film. A color separating filter of R, G or B is mounted to the light-incident side of each sensing portion. (Namely, the line CCD is a so-called 3-line color CCD). Further, a transmitting portion formed from plural CCD cells is provided in a vicinity of each of the sensing portions so as to correspond to each of the sensing portions. The charge accumulated in each CCD cell of each sensing portion is transmitted in order via the corresponding transmitting portion.

A CCD shutter 52 is provided at the light-incident side of the line CCD 74. The CCD shutter 52 switches one of a completely closed state to block incoming light to the line CCD 74 for dark correction, a completely open state to allow light to be incident on the line CCD 74 for normal reading or light correction, and a reduced-light state to reduce the amount of light incident on the line CCD 74 for linearity correction.

In addition, a compressor 94 which generates cooling air to cool the photographic film is disposed at the worktable 22. The cooling air generated by the compressor 94 is guided and supplied to the film carrier 38 by a guide tube 84. In this way, the portion of the photographic film positioned at the scanning section can be cooled. The guide tube 84 runs through a flow sensor 96 which detects the flow rate of the cooling air.

The turrets 36 may be, as shown in FIG. 6, a turret 36C for cyan filters which absorb red light, a turret 36M for magenta filters which absorb green light, and a turret 36Y for yellow filters which absorb blue light. A plurality of cyan filters 36C1, 36C2, and 36C3 of different densities are fitted in the turret 36C. Of the cyan filters, the filter 36C1 has the lowest density, the filter 36C2 has an intermediate density, and the filter 36C3 has the highest density. The other turrets 36M and 36Y have similar structure as that of the turret 36C. Each of the turrets 36C, 36M, and 36Y is rotatably supported in such a manner that the filters selected from the respective turrets overlap each other on the optical axis L. (Structure of Film Carrier)

Figure 7:
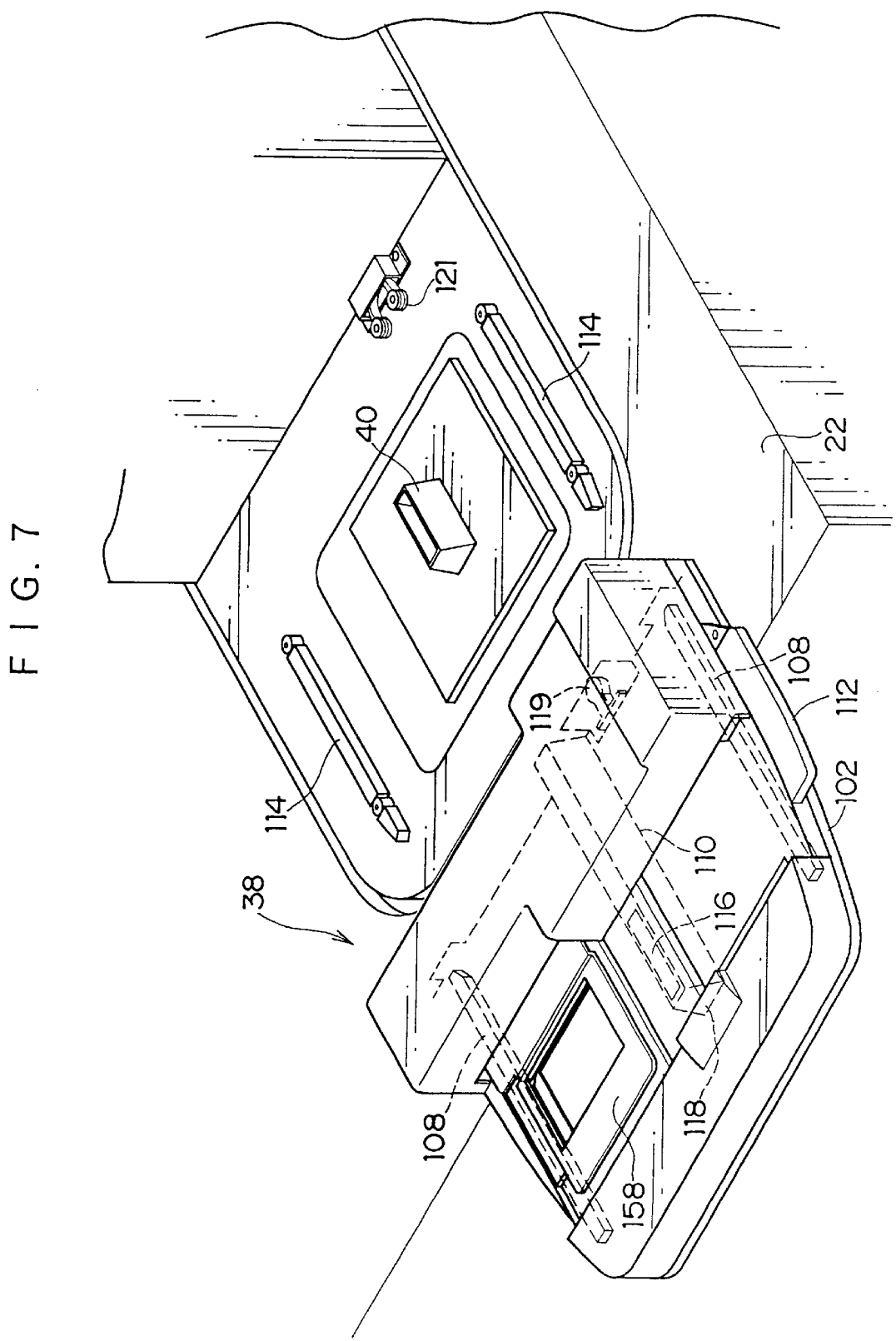
FIG. 7 is a perspective view showing the relationship between a setting portion and the film carrier relating to the first embodiment of the present invention.

As shown in FIG. 7, guide slots 108 and an insertion path 110, into which the diffusion box 40 is inserted, are formed on the under surface of a base 102 of the film carrier 38. The film carrier 38 is positioned onto the worktable 22 (i.e. a slit 116 of the base 102 is positioned on the optical axis L of the light source section 30) by an operator grasping handles 112 and fitting the guide slots 108 with guide rails 114 provided at both sides of the diffusion box 40. At this time, a male ball catch 119 provided on a side surface of the base 102 engages with a female ball catch 121 on a front wall so as to lock the film carrier 38 to the worktable 22.

Figure 8:
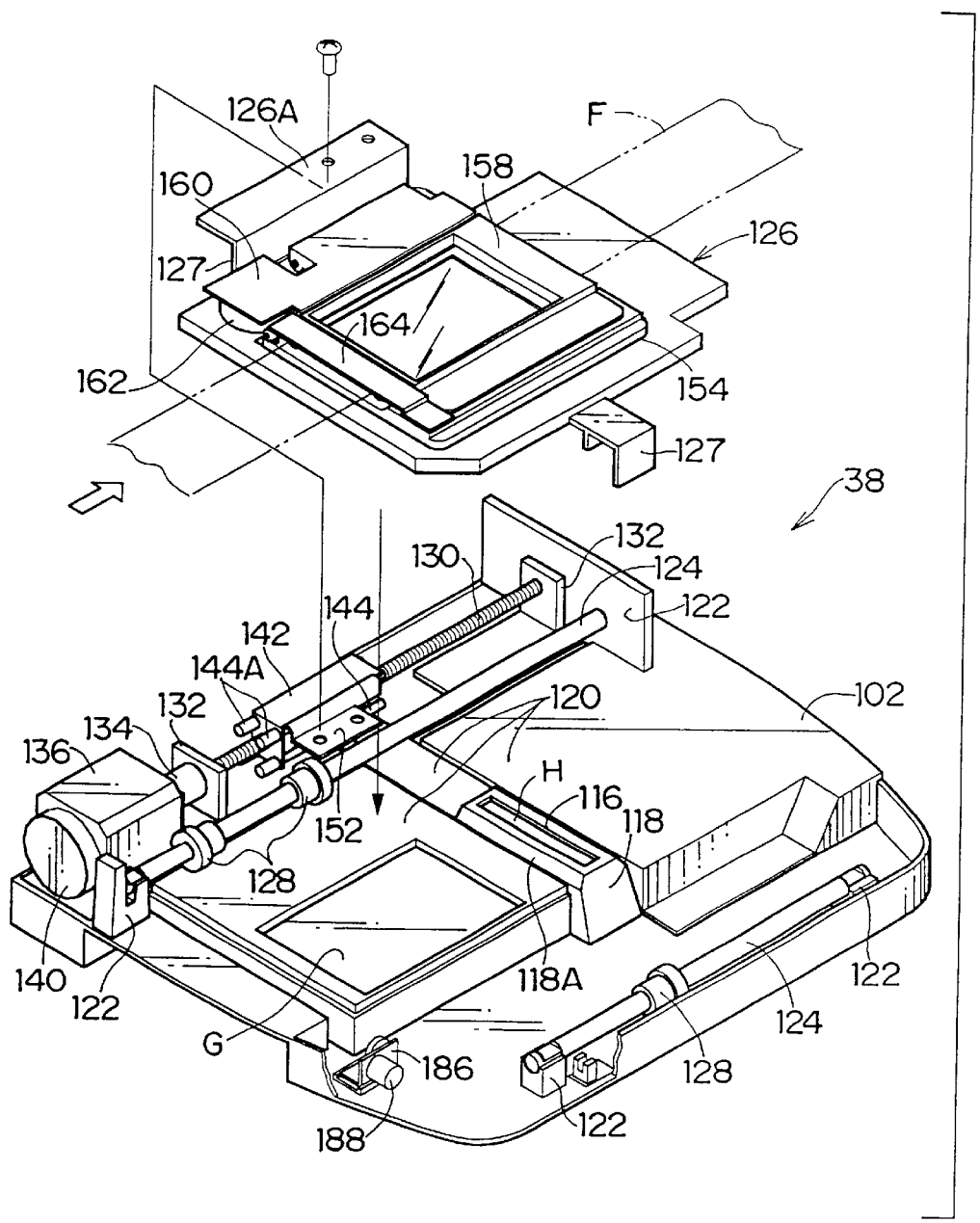
FIG. 8 is an exploded perspective view of the film carrier relating to the first embodiment of the present invention.

On the base 102, as shown in FIGS. 7 and 8, the slit 116 for illuminating slit light onto a photographic film F is provided above the diffusion box 40 (on the optical axis of the light source section 30). The slit 116 is formed on the top surface of a box 118. The bottom of the box 118 is open, and the corner portions of the top surface of the box 118 are tapered surfaces 118A. The slit 116 is covered with a glass H provided with the flat, smooth top surface. Covers 120 are provided at the periphery of the box 118. Due to this structure, no foreign matter will fall into the light source section 30 (see FIG. 2). Although the slit is covered with a glass in the above structure, the slit may be covered with any material through which light can pass, such as a mesh or a translucent plate like a diffuser.

At the longitudinal direction end sides of the slit 116, guide shafts 124 supported by supports 122 are disposed parallel to each other and perpendicular to the slit 116. Brackets 127 of a platen 126 are slidably supported by the guide shafts 124 via slide bearings 128.

At the outer side of one of the guide shafts 124, a feed screw 130 is disposed in parallel with the guide shafts 124. The both end portions of the feed screw 130 are rotatably supported by brackets 132. One end of the feed screw 130 is coupled to a drive shaft of a pulse motor 136 by a coupling 134.

A hand-turned knob 140 is provided at the drive shaft of the pulse motor 136 so that the feed screw 130 can be manually rotated to move the platen 126. The platen 126 can thereby be manually moved for checking the sensor position at times when operations for maintenance of the apparatus are carried out.

Figure 10:
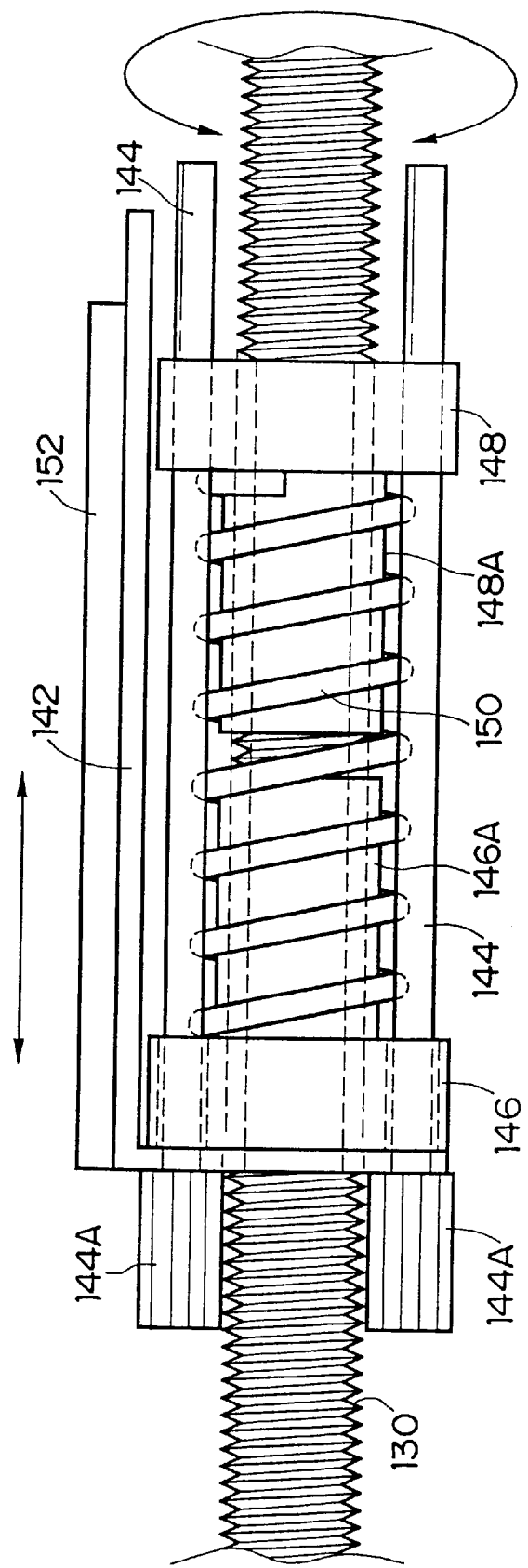
FIG. 10 is a side view showing a conveying mechanism of the film carrier relating to the first embodiment of the present invention.

As shown in FIG. 10, head portions 144A of long pins 144 extending parallel to the feed screw 130 are fixed on a side wall of a holder 142. The long pins 144 pass through a fixed nut 146 and a biased nut 148 which are screwed with the feed screw 130.

The biased nut 148 can slide with respect to the long pins 144. The fixed nut 146 is fixed on the side wall of the holder 142. A bias spring 150 is fitted on a boss portion 146A of the fixed nut 146 and a boss portion 148A of the biased nut 148 to urge the fixed nut 146 and the biased nut 148 in the axial direction of the feed screw 130. The surfaces of the teeth of the fixed nut 146 and the biased nut 148 thereby always contact that of the feed screw 130 to eliminate backlash.

As shown in FIG. 8, a horizontal portion of a plate spring 152 bent in a substantial L-shape is fixed to the holder 142 with a screw. A vertical portion of the plate spring 152 is fixed to a horizontal portion 126A of the platen 126. In this way, the platen 126 and the holder 142 are coupled together through the plate spring 152.

Due to the structure described above, when the feed screw 130 is rotated by the pulse motor 136, the fixed nut 146 and the biased nut 148 are moved and the platen 126 is slid along the guide shafts 124.

The restoring force of the plate spring 152 maintains constant positional relationship between the platen 126 and the feed screw 130 (i.e. the platen 126 moves parallel to the optical axis L within horizontal and vertical planes). Therefore, when the platen 126 and the holder 142 are coupled together, they can be aligned without the need for fine adjustments.

Figure 11:
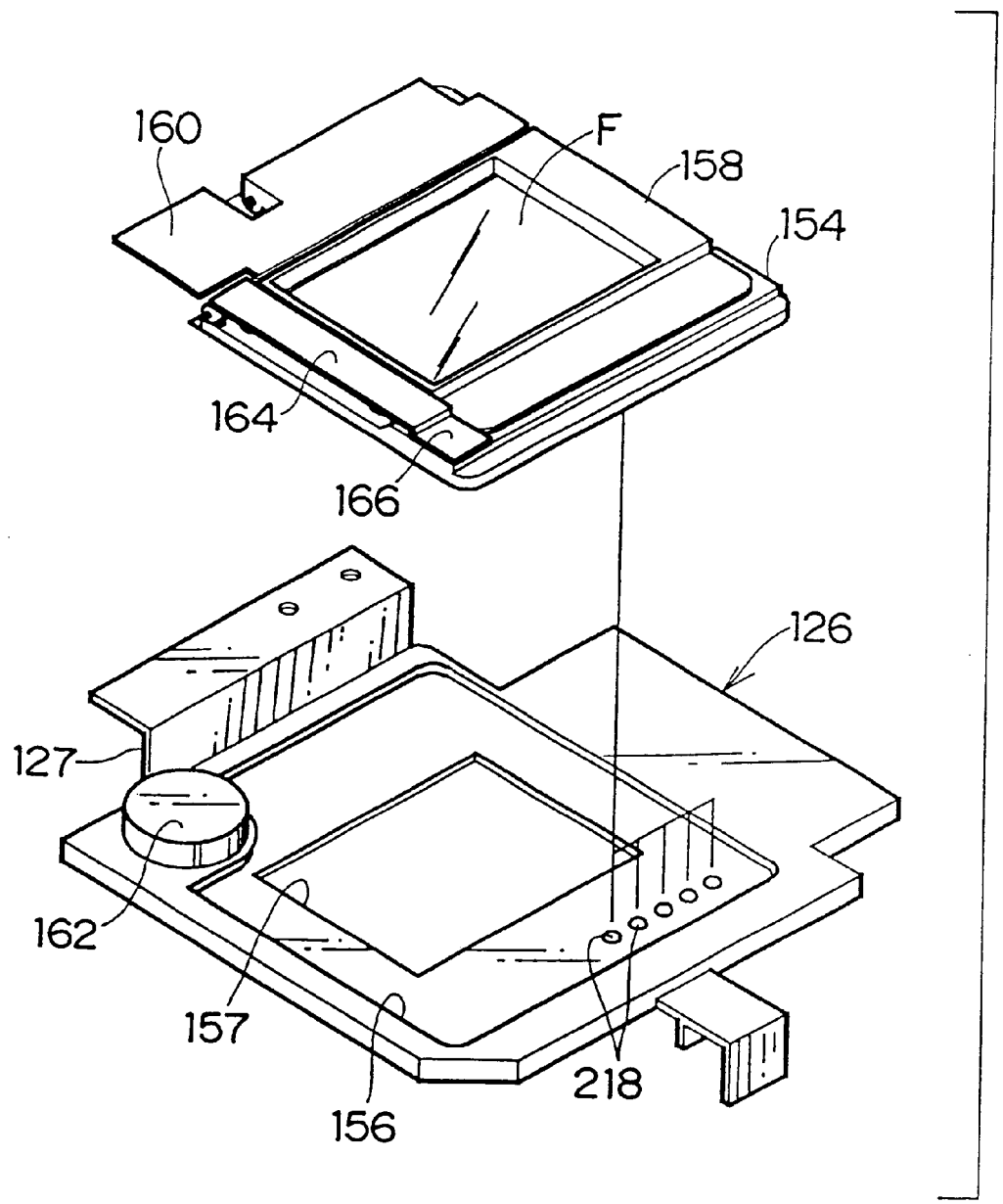
FIG. 11 is an exploded perspective view showing the relationship between a mask and a pressure plate of the film carrier relating to the first embodiment of the present invention.

As shown in FIG. 11, on the platen 126, a setting portion 156 in which a mask 154 is set is provided as a depression in a shape conforming to that of the mask 154. An opening 157 is formed in the central portion of the setting portion 156, and through the opening 157, the slit light from the slit 116 is illuminated onto the photographic film F set on the mask 154.

Figure 12:
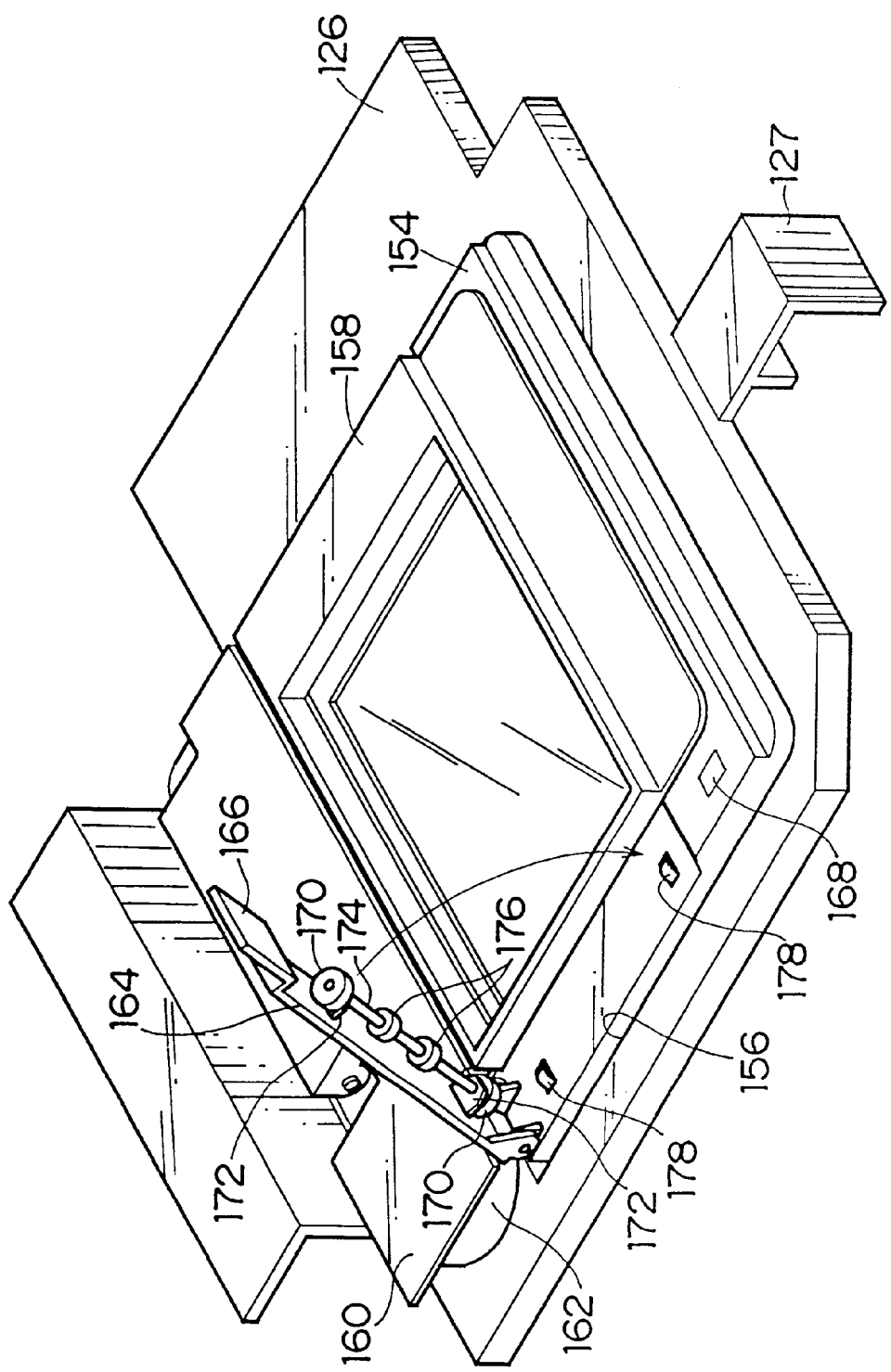
FIG. 12 is a perspective view showing the mask and the pressure plate of the film carrier relating to the first embodiment of the present invention.
Figure 13:
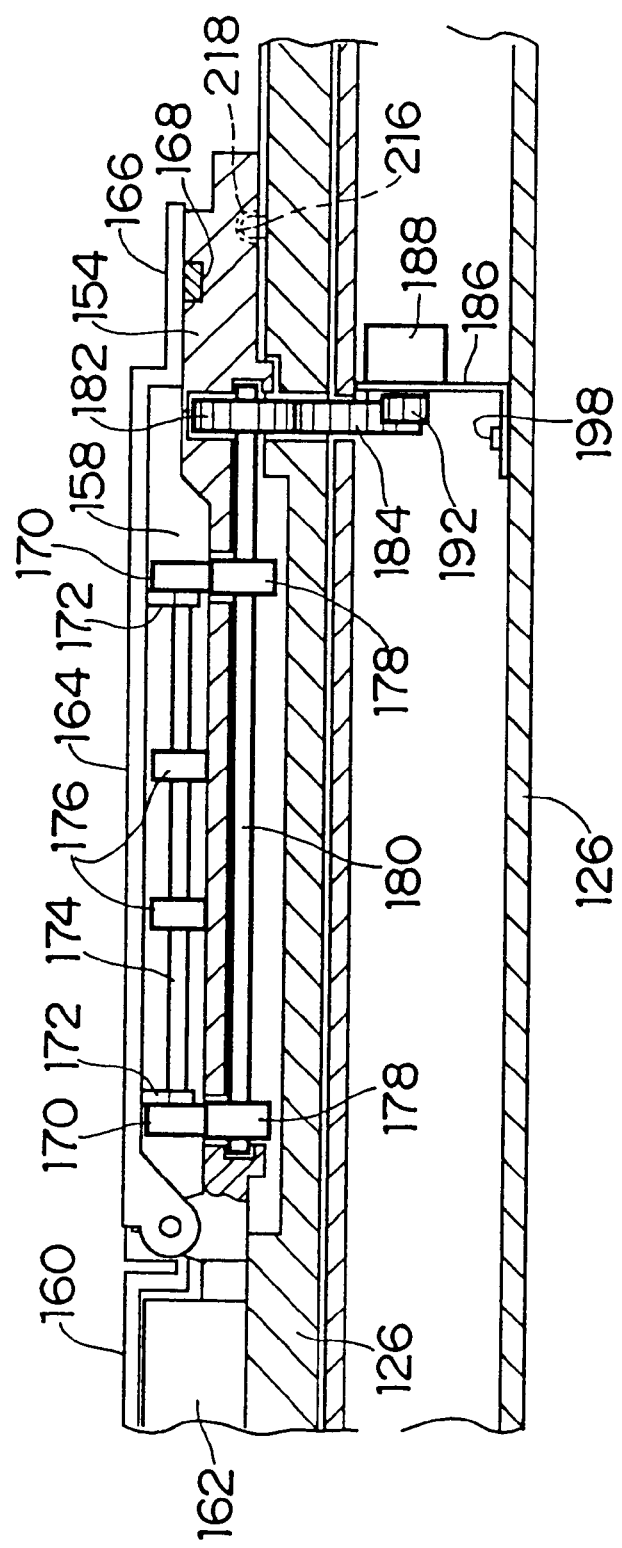
FIG. 13 is a cross-sectional view showing rollers of a hold plate of the film carrier relating to the first embodiment of the present invention.

As shown in FIGS. 12 and 13, a pressure plate 158 is supported on the mask 154 by a shaft such that the pressure plate 158 can be tilted. The photographic film F is sandwiched between the pressure plate 158 and the mask 154. At the end portion of the pressure plate 158, an attraction plate 160 is provided. The attraction plate 160 is attracted by a solenoid 162 provided on the platen 126 to set the mask 154 accurately on the platen 126.

Further, a hold plate 164 is tiltably supported by a shaft on the mask 154. An attraction plate 166 is attracted to a magnet 168 provided on the platen 126 to keep the hold plate 164 tilted downward. Shaft plates 172 are provided on the under surface of the hold plate 164. A shaft 174, to which driven rollers 170 made of rubber are attached, is supported by the shaft plates 172. Feed rollers 176 are disposed on the central portion of the shaft 174.

The upper surfaces of drive rollers 178 are exposed at the upper surface of the mask 154 in order to attach to the driven rollers 170. The drive rollers 178 are attached to a roller shaft 180 supported at the under surface of the mask 154 (see FIG. 13). A transmission gear 182 is provided on the end portion of the roller shaft 180. The transmission gear 182 meshes with a drive gear 184 provided at the base 102 side at a predetermined position of the platen.

Due to this structure, when the platen 126 has returned to its predetermined position, the photographic film can be fed frame-by-frame by the driven rollers 170, the drive rollers 178, and the feed rollers 176.

Figure 14:
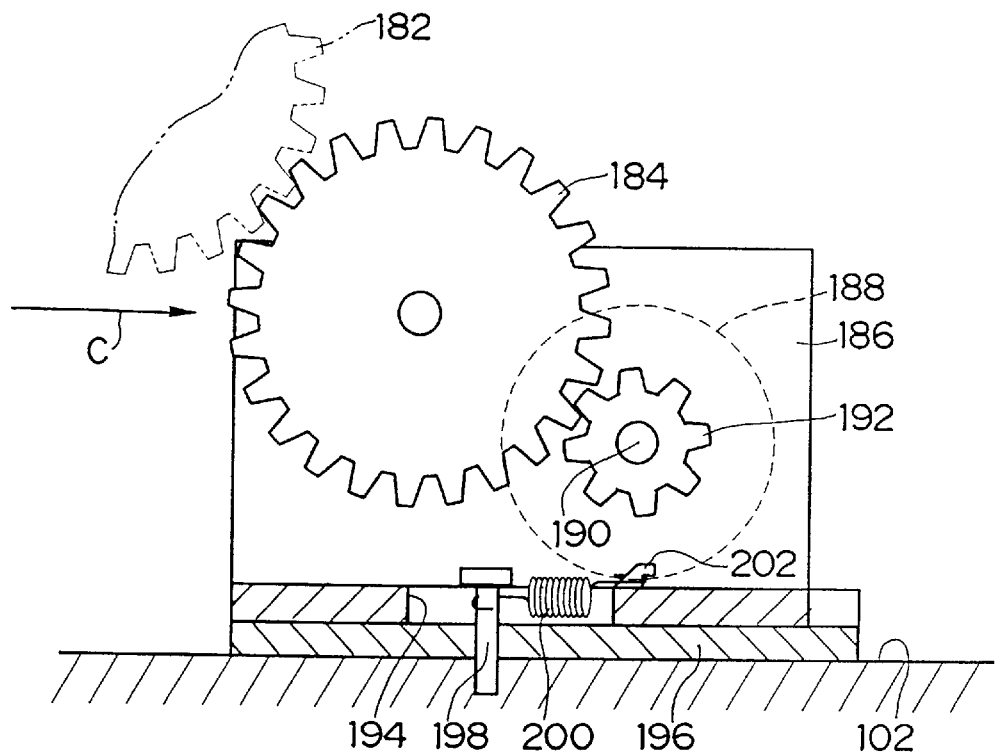
FIG. 14 is a cross-sectional view, as viewed from the side, showing a shock absorbing mechanism of a drive gear of the film carrier relating to the first embodiment of the present invention.
Figure 15:
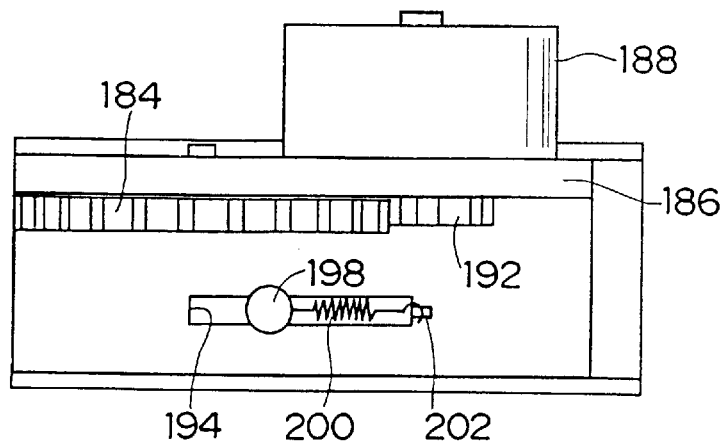
FIG. 15 is a cross-sectional view, as viewed from the top, showing the shock absorbing mechanism of the drive gear of the film carrier relating to the first embodiment of the present invention.

As shown in FIGS. 14 and 15, the drive gear 184 is supported by an L-shaped bracket 186 (see FIG. 8). A motor 188 is mounted to the bracket 186, and a motor gear 192 fixed on a drive shaft 190 engages with the drive gear 184.

In the base surface of the bracket 186, an elongated hole 194 is formed parallel to the feed screw 130. A pin 198, which stands upright through a guide plate 196 fixed to the base 102, extends through the elongated hole 194.

One end of a spring 200 is coupled to the shaft portion of the pin 198, and the other end of the spring 200 is hooked on a hook 202 projecting from the base surface of the bracket 186. When the transmission gear 182 is not meshing with the drive gear 184, the spring 200 is in a free state.

Figure 9:
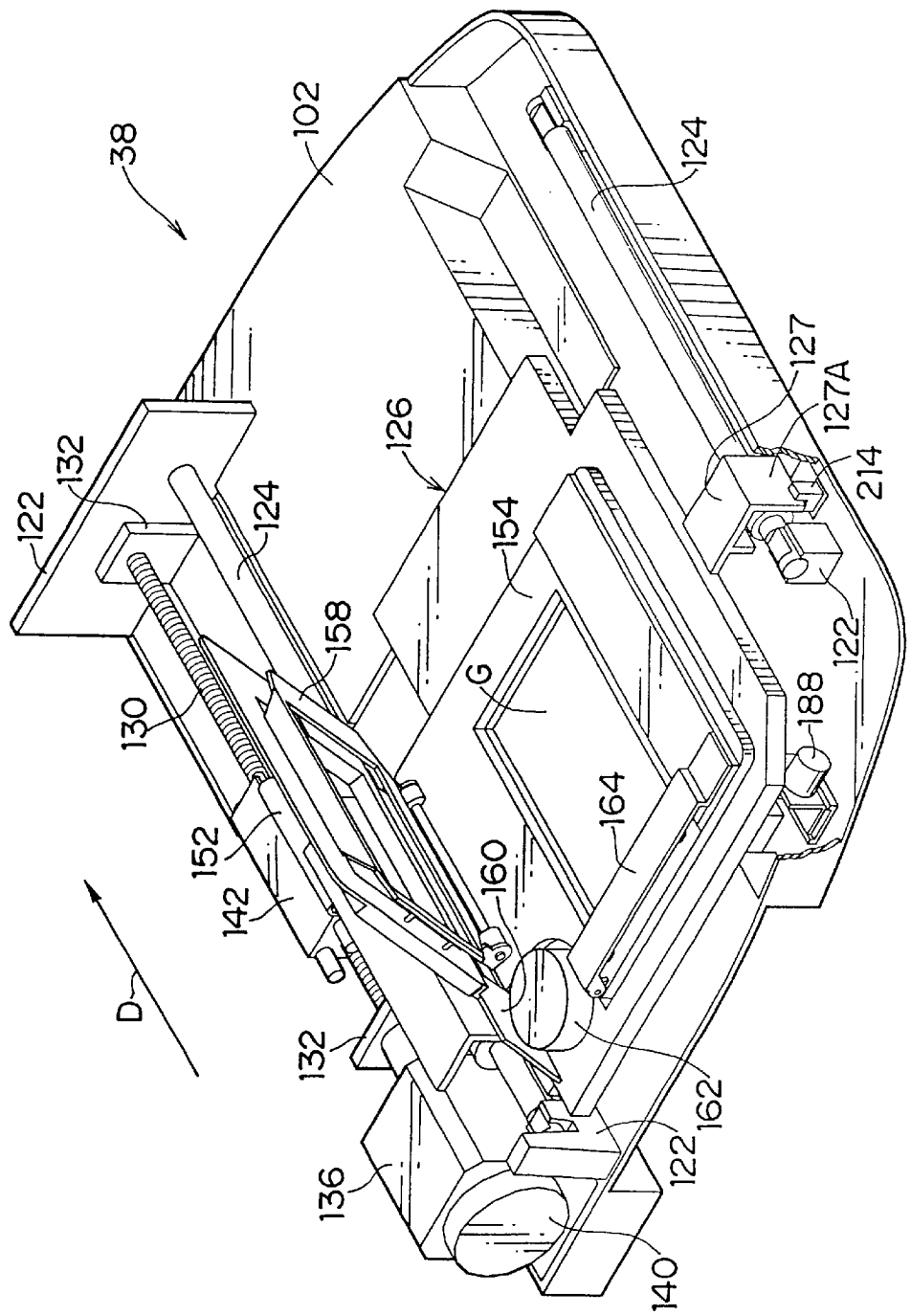
FIG. 9 is a perspective view of the film carrier relating to the first embodiment of the present invention.

In this structure, when the platen 126 returns to its predetermined position, that is, when the transmission gear 182 moving in the direction of arrow C in FIG. 14 collides with the drive gear 184, the bracket 186 slides in the direction of arrow C to absorb the shock. Damage to the surfaces of the teeth of the transmission gear 182 and the drive gear 184 is thereby suppressed. Although the gear is used in the above structure as the means for transmitting the driving force, the driving force may be transmitted by rubber rollers or the like pressed against each other. The predetermined position of the platen 126 is the position thereof at which a plate portion 127A of the bracket 127 blocks a photo interactor 214 (see FIG. 9). The return position of the platen 126 coupled with the holder 142 is controlled by the number of pulses sent from pulse motor 136 which rotates the feed screw 130 fixed to the holder 142.

Further, shown in FIG. 13, a recess 216 is formed in the under surface of the mask 154. When the mask 154 is set on the platen 126, a portion of the mask 154 other than the region at which the recess 216 is formed presses any of button switches 218 (five bit sensors) disposed along a line on the platen 126 so that the opening size of the mask 154 can be determined.

In the film carrier 38 having the above-described structure, the photographic film F such as a 220 size film (long-roll brownie size film) is sandwiched between the mask 154 and the pressure plate 158. Pre-scanning is performed while the platen 126 is moved in the direction of arrow D in FIG. 9, and fine scanning is performed while the platen 126 is moved in the direction opposite to the direction of arrow D.

More specifically, first, the platen 126 is returned to its predetermined position. Then, the first image frame is positioned on the mask 154 with reference to a positioning line marked on a ground glass G.

In this state, pre-scanning is performed while the platen 126 is passing over the slit 116, and fine scanning is performed while the platen 126 is returned. Next, the platen 126 is returned to the predetermined position. Then, due to the driving force supplied from the drive gear 184, the driven rollers 170 and the drive rollers 178 disposed at the mask 154 feed the photographic film by the length of one frame.

Next, the platen 126 is moved reciprocally over the slit 116 to again perform pre-scanning and fine scanning as described above. Then, the photographic film is fed by the length of one frame again.

Thus, by providing the mask 154 with the driven rollers 170 and the drive rollers 178, the photographic film can be automatically fed frame-by-frame. The last frame must be positioned with reference to the positioning line because the trailing end portion of the photographic film is no longer nipped by the driven rollers 170 and the drive rollers 178.

Further, the entire photographic film can be fed over the slit 116 by the driven rollers 170 and the drive rollers 178 to pre-scan all of the images of the photographic film and obtain the image data of all of the frames. In this way, for example, a series of scenes can be finished at the same density.

Next, a film carrier of a second embodiment of the present invention will be described. Members which are the same as those of the first embodiment are designated by the same reference numerals.

Figure 16:
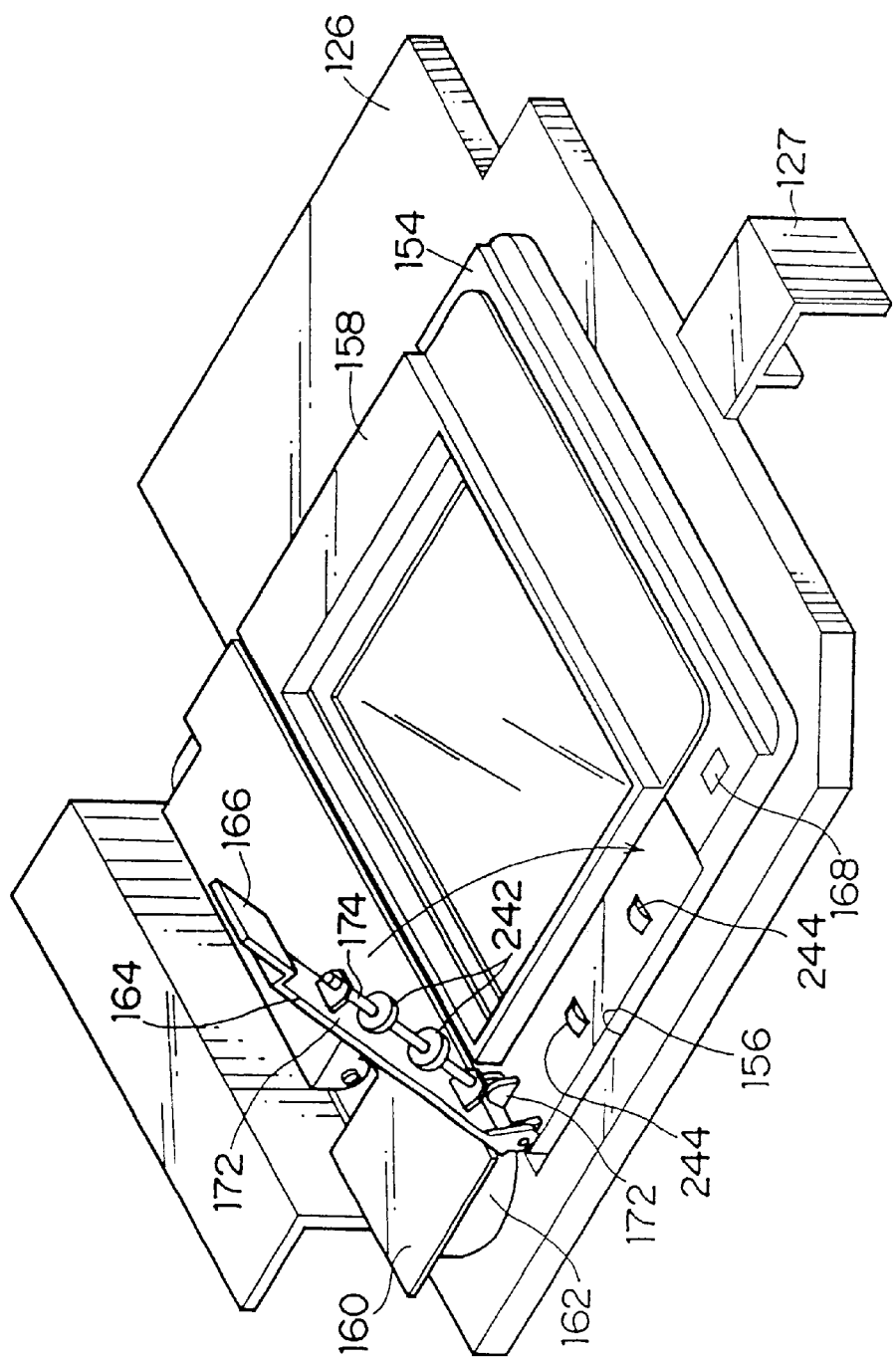
FIG. 16 is a perspective view showing a mask and a pressure plate of a film carrier relating to a second embodiment of the present invention.
Figure 17:
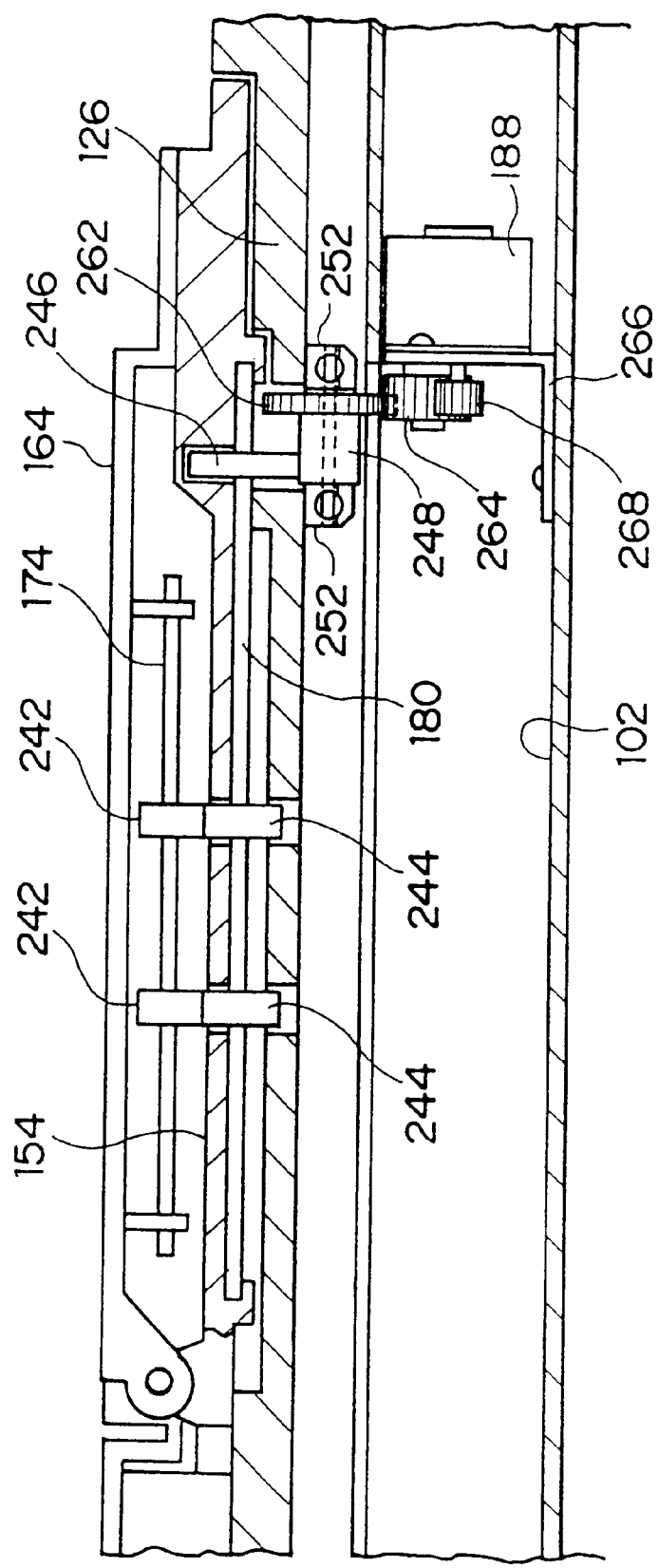
FIG. 17 is a cross-sectional view showing the relationship between driven rollers and drive rollers of the film carrier relating to the second embodiment of the present invention.

As shown in FIGS. 16 and 17, driven rollers 242 made of rubber are attached to the central portion of the shaft 174. The upper surfaces of drive rollers 244 are exposed from the mask 154 at positions such that the edge portion of the photographic film can be nipped and conveyed between the drive rollers 244 and the driven rollers 242.

The drive rollers 244 are attached to the roller shaft 180 supported at the under surface of the mask 154. A transmission roller 246 is attached to an end portion of the roller shaft 180. The transmission roller 246 is pressed against a drive roller 248 which will be described below, and the rotational force is transmitted from the drive roller 248 to the transmission roller 246.

Figure 18:
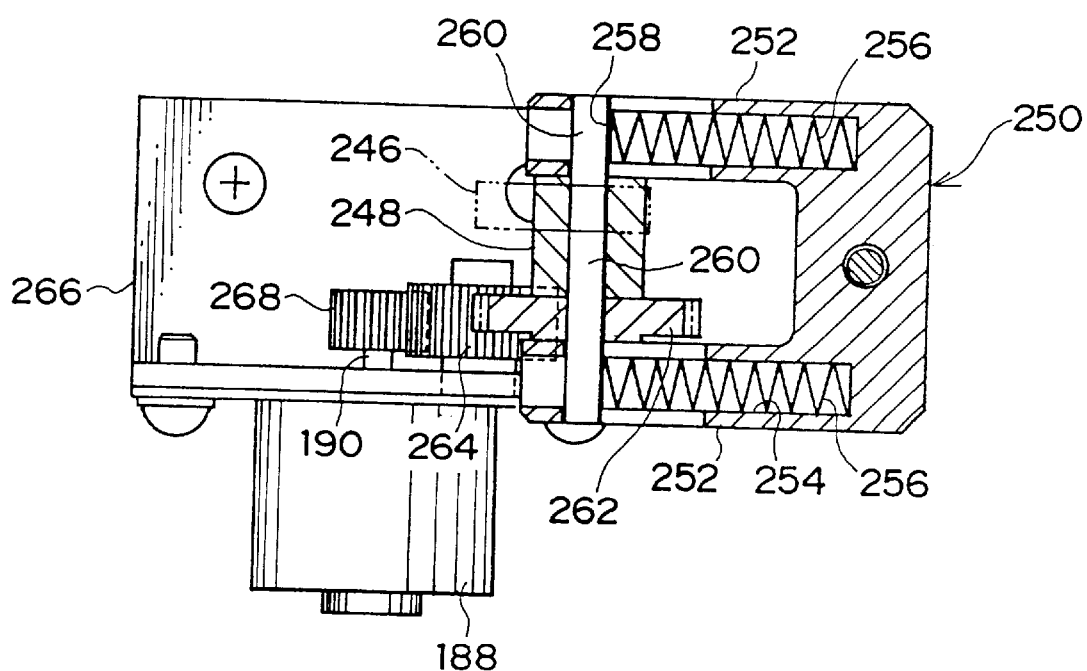
FIG. 18 is a cross-sectional view, as viewed from the top, showing a shock absorbing mechanism of a drive gear of the film carrier relating to the second embodiment of the present invention.
Figure 19:
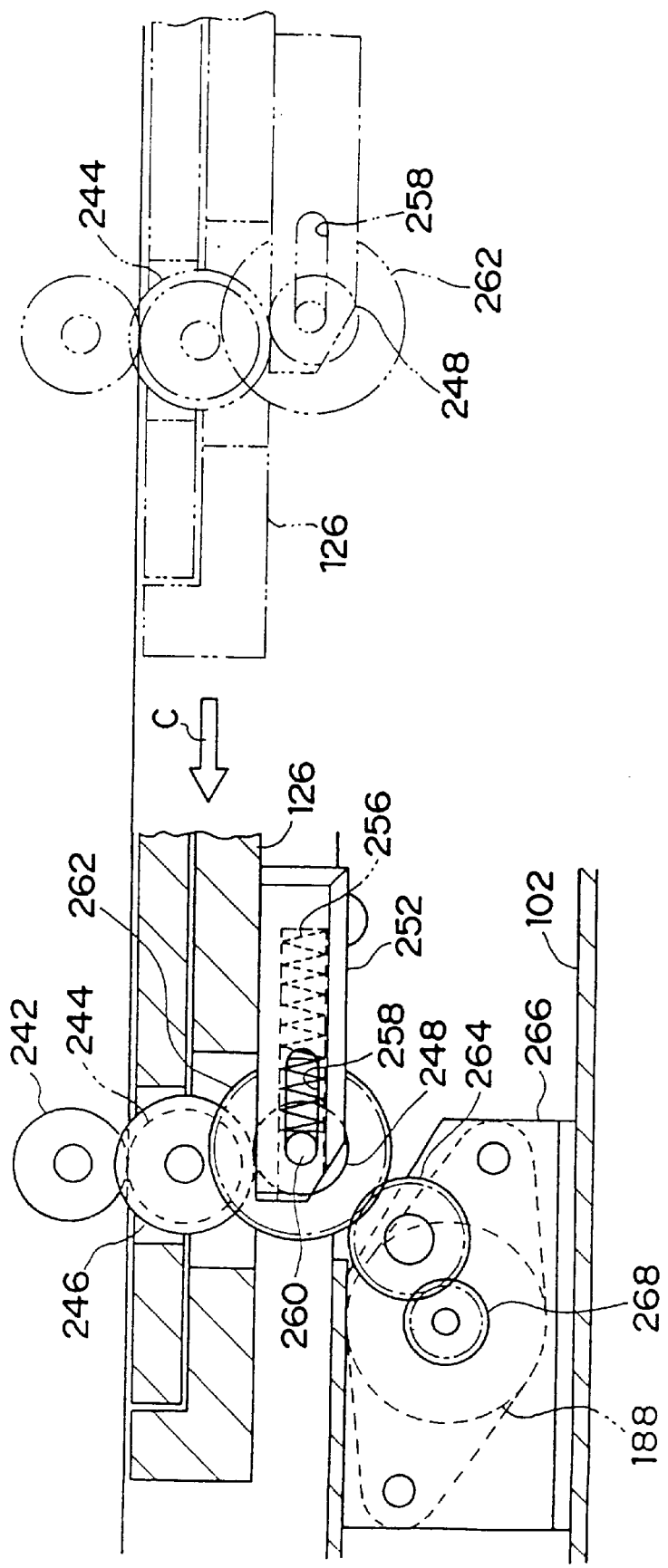
FIG. 19 is a cross-sectional view, as viewed from the side, showing the shock absorbing mechanism of the drive gear of the film carrier relating to the second embodiment of the present invention.

As shown in FIGS. 18 and 19, a bracket 250, which is substantially U-shaped when viewed from the top, is fixed by a screw to the under surface of the platen 126. An accommodating portion 254 is formed longitudinally in the core of each of arm portions 252 of the bracket 250. A compression spring 256 is accommodated in each of the accommodating portions 254.

An elongated hole 258 is formed in the distal end portion of each of the arm portions 252. Both end portions of a shaft 260 are rotatably and slidably supported in the elongated holes 258. The drive roller 248 is fixed at the central portion of the shaft 260. The drive roller 248 is pressed against the transmission roller 246 by the compression springs 256 which urge the shaft 260 to the left end portions of the elongated holes 258.

A drive gear 262 is fixed to the shaft 260. When the platen 126 is returned to the predetermined position, the drive gear 262 is in a position in which it can mesh with an intermediate gear 264 rotatably supported by a shaft of an L-shaped mount 266 fixed to the base 102.

The motor 188 is mounted to the mount 266, and a motor gear 268 fixed to the driving shaft 190 meshes with the intermediate gear 264.

In this structure, when the platen 126 returns to its predetermined position, that is, when the driving gear 262 moving in the direction of arrow C in FIG. 19 collides with the intermediate gear 264, the shaft 260 slides in the direction opposite to the direction of arrow C to absorb the shock.

The present second embodiment differs from the first embodiment in that, in the second embodiment, the drive gear 262 provided at the platen 126 has a shock absorbing function, and the drive roller 248 and the transmission roller 246 are pressed against each other by utilizing the spring force of the compression springs 256 which buffer the shock, thereby reducing the number of parts. Further, in this structure, the intermediate gear 264 and the drive gear 262 may be rollers made of rubber.

Due to the above-described structure of the present invention, the operator need not open the pressure plate to feed the photographic film by the length of a frame. Further, the shock (force of impact) between the drive source and the rotational force transmitting member at the time of their abutment can be absorbed. In addition, no foreign matter will accidentally fall into the scanning section.

What is claimed is:

1. A film carrier for conveying a photographic photosensitive material, on which an image is recorded, over a scanning section through which light from a light source section passes, comprising:

a base placed above the scanning section;

a platen movable over said base;

holding means which holds the photographic photosensitive material and can be attached to and removed from said platen;

a drive source provided at said base;

first conveying means which is provided at said platen and to which driving force from said drive source is transmitted when said platen is moved to a predetermined position; and second conveying means which is provided at said holding means and to which driving force from said first conveying means is transmitted so that said second conveying means conveys the photographic photosensitive material.

2. A film carrier according to claim 1, wherein said first conveying means includes shock buffering means for buffering the shock between said first conveying means and said drive source when said platen is moved to the predetermined position.

3. A film carrier according to claim 2, wherein:

said first conveying means comprises a first rotational force transmitting member rotatably attached to a support member, rotational force being applied to said first rotational force transmitting member from said drive source when said platen is moved to the predetermined position;

said shock buffering means comprises a support portion which supports said first rotational force transmitting member such that said first rotational force transmitting member is slidable in a moving direction of said platen, and urging means for urging said first rotational force transmitting member toward said drive source; and said second conveying means comprises driven rollers provided at said holding means, drive rollers which are provided at said holding means and which, together with said driven rollers, nip and convey the photographic photosensitive material, and a second rotational force transmitting member provided at a shaft to which said drive rollers are attached, rotational force being applied to said second rotational force transmitting member from said first rotational force transmitting member.

4. A film carrier according to claim 3, wherein a periphery of a slit, which is provided in said base and corresponds to the scanning section, is covered by a cover, and said slit is covered by a translucent flat plate.

5. A film carrier according to claim 2, wherein a periphery of a slit, which is provided in said base and corresponds to the scanning section, is covered by a cover, and said slit is covered by a translucent flat plate.

6. A film carrier according to claim 1, wherein a holding means without said second conveying means can be attached to and removed from said platen.

7. A film carrier according to claim 6, wherein a periphery of a slit, which is provided in said base and corresponds to the scanning section, is covered by a cover, and said slit is covered by a translucent flat plate.

8. A film carrier according to claim 1, wherein a periphery of a slit, which is provided in said base and corresponds to the scanning section, is covered by a cover, and said slit is covered by a translucent flat plate.

9. A film carrier for conveying a photographic photosensitive material, on which an image is recorded, over a scanning section through which light from a light source section passes, comprising:
- a base placed above the scanning section;
- a platen movable over said base;
- holding means which holds the photographic photosensitive material and can be attached to and removed from said platen;
- a drive source provided at said base; and
- a conveying section provided at said holding means, and when said platen is moved to a predetermined position, driving force from said drive source is transmitted to said conveying section so that said conveying section conveys the photographic photosensitive material.

10. A film carrier according to claim 9, wherein a periphery of a slit, which is provided in said base and corresponds to the scanning section, is covered by a cover, and said slit is covered by a translucent flat plate.

11. A film carrier for conveying a photographic photosensitive material, on which an image is recorded, over a scanning section through which light from a light source section passes, comprising:
- a base placed on a worktable provided above the scanning section;
- a platen movable over said base;
- a mask which is set on said platen;
- a pressure plate, the photographic photosensitive material being sandwiched between said pressure plate and said mask;
- a moving device supported on the base for moving the platen reciprocally over the base;
- a conveying device including a hold plate which is tiltably supported by a shaft on the mask, for conveying the photographic sensitive material.

12. The film carrier as recited in claim 11, wherein the moving device includes a guide shaft which is supported on the base via a pair of support plates mounted on the base, a bracket which is slidably supported on the platen by the guide shaft, and a control device which controls sliding of the platen.

13. The film carrier as recited in claim 12, wherein the control device includes a feed screw which is mounted on the base so as to be parallel to the guide shaft, and a pulse motor which drives the feed screw.

14. The film carrier as recited in claim 11, wherein the conveying device further includes driven rollers which are supported by a shaft mounted on the hold plate, drive rollers which are provided on the mask so as to nip with the driven rollers, and a driving device which drives the rollers.

15. The film carrier as recited in claim 11, further comprising a locking device having a protruding portion provided on a side of the base and a receiving portion provided on the worktable so as to engage with the protruding portion.

* * * * *